United States Patent [19]

Tsuhako

[11] 4,282,095
[45] Aug. 4, 1981

[54] AQUARIUM FILTERING SYSTEM

[76] Inventor: Parker I. Tsuhako, 1412 W. 148th St., Gardena, Calif. 90247

[21] Appl. No.: 109,166

[22] Filed: Jan. 2, 1980

[51] Int. Cl.³ .............................................. E04H 3/20
[52] U.S. Cl. ..................................... 210/169; 210/387
[58] Field of Search .................... 210/169, 387; 119/3, 119/5

[56] References Cited

U.S. PATENT DOCUMENTS

| | | | |
|---|---|---|---|
| 3,169,922 | 2/1965 | Homboseel | 210/387 |
| 3,244,287 | 4/1966 | Staunem et al. | 210/387 |
| 3,310,172 | 3/1967 | Belluhn | 210/387 |
| 3,359,709 | 12/1967 | Revell | 210/387 |
| 3,364,662 | 1/1968 | Revell | 210/387 |
| 3,757,949 | 9/1973 | Halvorsen et al. | 210/387 |
| 3,815,547 | 6/1974 | Willizer et al. | 119/5 |
| 4,005,018 | 1/1977 | Wymon et al. | 210/387 |
| 4,026,719 | 6/1980 | Javius | 210/169 |

*Primary Examiner*—Theodore A. Granger
*Attorney, Agent, or Firm*—Henry M. Bissell

[57] ABSTRACT

An aquarium filtering system utilizing an immersible housing having perforations on two opposed surfaces, an external supply and take-up means for filter material. The immersible housing and the portion of the filtering system positioning the supply and take-up of filter material act jointly to form a structure for positioning the filtration system in an aquarium, and storing the filter material outside of the aquarium unless in use. A fluid conduit is provided in the immersed portion of the housing for introduction and/or removal of the aquarium medium. Guides are provided over the edges of the system in order to control motion of the filter medium, and overflow control is provided above the aquarium water level in the immersed portion of the housing.

10 Claims, 5 Drawing Figures

U.S. Patent    Aug. 4, 1981    4,282,095
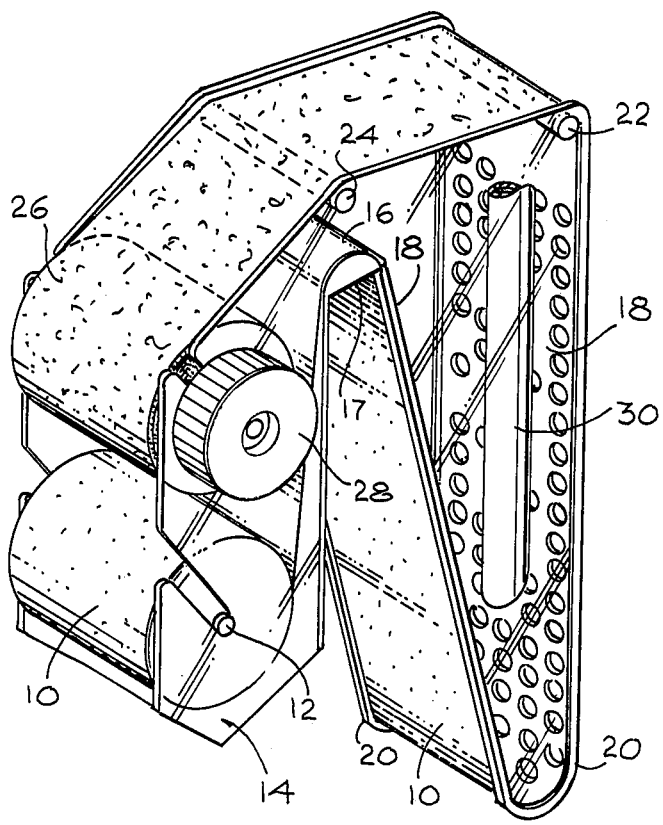
Fig. 1
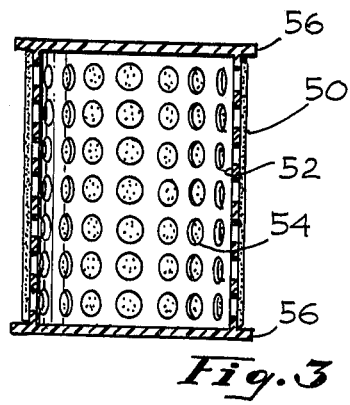
Fig. 3
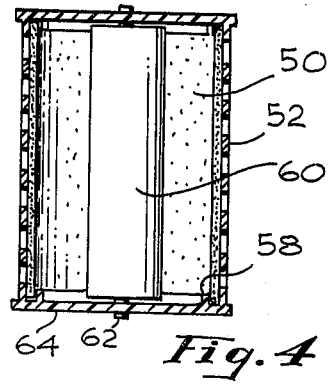
Fig. 4
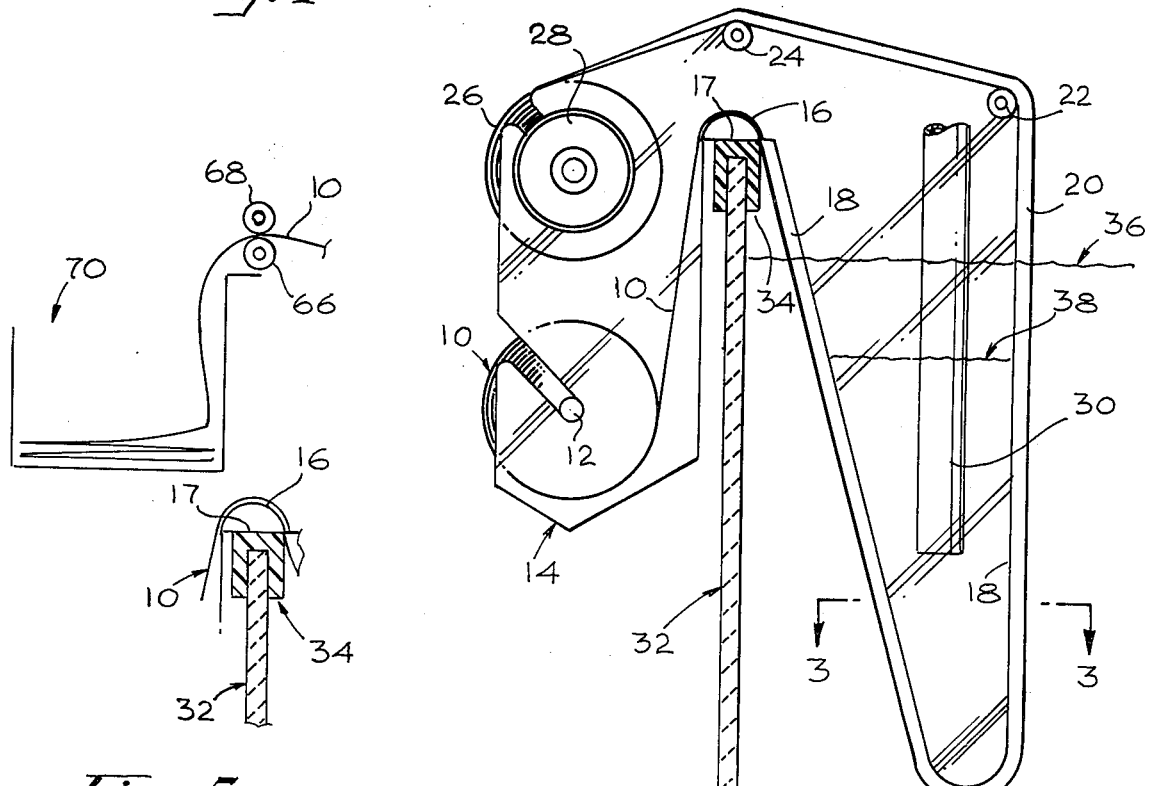
Fig. 5
Fig. 2

AQUARIUM FILTERING SYSTEM

BACKGROUND OF THE INVENTION

1. Field of the Invention.

The present invention principally relates to aquarium filtering devices, and more particularly relates to a filtering device providing for easy change of filtration material, external supply and take-up of the filter material, and an immersed filtering surface traversed by a filtering medium.

2. Description of the Prior Art.

Many means are utilized to filter undesirable solid materials from aquariums. In ordinary filtration equipmemt for aquariums, bubble aerators are provided with means for filtration, usually a removable screen or flossy material which collects particulate matter. This does not provide for a continuous filtering system or an improved supply of filter material which is removable from the aquarium tank without disturbing the contents of the tank, or taking numerous steps to renew the filtration material.

In addition, external filtration systems are known, such as those utilizing siphon removal of water to an externally positioned filtration bed, and then recirculation of the water to the aquarium by a separate system.

In the broader general art of filtering apparatus, various filtering systems using supply and take-up reels are known, and certain immersed systems are known; however, these are directed to the art of industrial filtering systems, utilizing, for instance, bed or drum type filters. In the drum systems, the filter material is pulled around the drum or the whole unit is rotated, while immersed in the fluid to be filtered. Thus, since the systems are usually designed for the removal of solid material which is to be saved, they are not designed to function as a small integral part of a large fluid holding system, and are not adaptable to the subject area of endeavor, due to the size and the structure used to accommodate the large size units.

It is therefore an object of the present invention to provide a filtering system which is simple and easy to operate as well as being economical and efficient, and which allows for the external provision of a filter medium which then can be immersed in an aquarium tank, and after an appropriate period of filtration can be removed from the tank without removal of the whole filtration system, reaching physically into the tank or providing a complete separate filtration system. A further object is to provide optional continuous filtration medium flow in a simple system, without disturbing the aquarium tank. It is further desired to provide a system compatible with conventional fluid pumping systems for aquariums whereby a suitable connection to the pumping systems presently existing in many aquariums would produce an efficient and simple filtration system.

SUMMARY OF THE INVENTION

In both commercial and home use aquariums, there is a need for filtration of undesirable materials from the aquarium medium due to the continuous build up of undesirable materials in the aquarium which will eventually decompose, and can produce problems such as diseases. Additionally there is a need for aeration and/or heating or cooling of the medium in order to provide oxygen, carbon dioxide, etc. for the inhabitants of the aquarium, and to control the temperature of the aquarium. It is further desirable to have the filtration effected without disturbing the remainder of the system.

Thus the present invention provides a filtration housing which is immersed in an aquarium along an edge of the aquarium and is perforated on its opposed walls and along its lower or bottom surface. In the preferred form the perforated walls are joined at the bottom to form a "V" or "U" shaped structure, but more rectangular shapes may be used. The housing is provided with one or more extensions which form an external support for both used and unused filter material adjacent the position of the filter housing in the aquarium. As a result, the filter medium supply, and used medium storage are external to the aquarium, and can be renewed without disturbing the aquarium itself. A new supply can be drawn over the edge of the aquarium, utilizing a connection between the depleted and new supply of filtration medium as a means to guide the new medium over the perforated surface of the immersed housing, and return it to the used filtration material take-up mechanism which may well be combined with either mechanical, electrical, electro-mechanical, or other drive means which pull the material through the immersed housing. Fluid is either provided to the central portion of the housing by, for example, a pipe placed centrally in the housing and externally connected to the water circulation/heating pump, or the same tube may be utilized as a pickup tube to draw the fluid in the tank through the filter material, into the central portion of the housing, and back to the tank via the pump. Numerous holes or perforations, of any shape, can be utilized along the filter medium contact in the housing, to provide for the fluid flow either into or out of the housing, and thus to provide for complete and positive filtration of the aquarium's medium.

In addition the present system provides a large renewable filtration surface area, without requiring bulky equipment and supply storage, and allows for rapid removal of contaminants so that the aqueous aquarium medium is maintained in good condition.

In one embodiment of the present invention the filter material would be provided on a reel, and the take-up would be on a manually operated reel, which the owner or user of the aquarium could turn to pull the filter material through the housing. When the end of the initial reel of filter material is reached, additional filter material could be attached to the end of the first reel, e.g. by tape or clips provided on the material, and pulled directly through the filter housing without disturbing the positioning of the filtration system. Further, the take-up for the filter material could be a pair of pinch rollers and drive means for the rollers which are turned periodically, or could be an electrically driven motor, on the take-up reel or on the pinch rollers. Thus, the expended filter medium could be collected either as layers in a tray or on its own separate replacable reel.

In the embodiment where the fluid is provided to the housing, the filter material runs on the inside of the perforated portion of the housing, and is then pressed against the perforated housing, by virtue of fluid pressure in the immersed housing. The fluid level in the immersed portion would then be higher than the fluid level in the tank itself, and gravity flow would force the fluid through the filter material and the perforated portions of the housing.

In another preferred embodiment the fluid medium in the filter is drawn from the aquarium itself and out of the system of the present invention for direct pumping back to the aquarium. In this embodiment the perforations are internal to the filter medium, and the fluid flow would be from the aquarium itself into the central portion of the housing. The level in the central portion of the housing is then lower than the level in the aquarium, and a pressure differential is produced, causing flow through the filtration medium. This embodiment also presents the improvement of filtering the fluid before pumping which minimizes the possibility of pump clogging.

BRIEF DESCRIPTION OF THE DRAWINGS

A better understanding of the present invention may be had from a consideration of the following detailed description, taken in conjunction with the accompanying drawing in which:

FIG. 1 is an isometric view of one particular arrangement of the invention;

FIG. 2 is a side elevational view of the filter system of FIG. 1;

FIG. 3 represents a section taken along lines 3—3 of FIG. 2;

FIG. 4 is another section taken along lines 3—3 of FIG. 2, showing a second embodiment; and FIG. 5 is a schematic of a used filter material take-up system.

DESCRIPTION OF THE PREFERRED EMBODIMENTS

In FIG. 1 of the present drawings, filtration material 10 is provided on reel 12 and placed in housing 14. The material 10 passes over guide 16 adjacent wall 17 and adjacent perforated structure 18. Between perforated structure 18 and the external housing, preferably of transparent plastic, positioning lips 20 hold the filter material in position substantially throughout its course through the aquarium, and up to guide rollers 22 and 24 before being rewound on reel 26 having mechanical take-up drive means such as the knob 28. The fluid medium being filtered is, in this embodiment, drawn from the aquarium, through the filtration medium 10, then through the perforations, and into the central area. It is then withdrawn from the central area through fluid conduit 30, maintaining the fluid level in the central area of the housing lower than in the aquarium itself, thus producing gravity fluid flow across the filter medium. The conduit 30 may extend out of the housing 14 through an opening (not shown) in the remote side wall for connection to a normally-associated circulating pump (not shown).

In FIG. 2 the apparatus of the present invention is shown in position on an aquarium wall 32 and frame 34. In this case filter material 10 is positioned by means of reel 12 in housing 14, traverses guide 16, and passes adjacent to perforated surface 18, between guide lips 20, into the aqueous medium in the aquarium, and from thence out of the medium and around guide rollers 22 and 24 and back to reel 26. In this embodiment, fluid level in the aquarium is maintained at the level 36, and the level within the housing of the present invention is maintained at 38.

Drive of the take-up reel 26 may be accomplished either electrically, mechanically, or by any means desired. The fluid is drawn through fluid conduit 30, out of the aquarium tank, and into a pump (not shown) for circulation into the aquarium tank. If manual feed of the filter medium of the filtration system of the present invention is utilized, then, when the filtering element becomes dirty or clogged by the material being filtered, the filter may be manually advanced an amount sufficient to permit the free flow of fluid through the perforations 18.

FIG. 3 shows a preferred embodiment of the present invention, in section taken along lines 3—3 of FIG. 2, wherein the filtration medium 50 is externally adjacent perforated plate 52, having holes 54 positioned over a substantial portion of its surface area, to allow water to flow from the aquarium, through filter medium 50 and holes 54 and into the central portion of the housing of the present invention. Lips 56 are provided to guide and position filtration medium 50 as well as protect it and seal the edges to prevent free fluid flow from the aquarium into the housing.

In FIG. 4, the filtration medium 50 is positioned internally to perforated surface 52. In this case, internal guide lips 58 are provided, and guide roller 60 is positioned at the bottom of the immersed portion of the housing. It is shown held in position by a mounting 62 in the housing wall 64.

The embodiment shown in FIG. 5 utilizes filter medium 10 entering the aquarium over guide surface 16, and further incorporates dual take-up rollers 66 and 68, either of which may be provided with electrical or mechanical drive means (not shown) to advance the filter medium 10 through the system and deposit the expended medium in tray 70 where it is stored for later disposal.

Although there have been described above specific arrangements of an aquarium filtering system in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. An immersible aquarium filtration system comprising:
   (a) filtration medium supply structure for mounting adjacent an aquarium;
   (b) expended filtration medium storage structure for mounting adjacent an aquarium;
   (c) an immersible housing comprising:
      (1) a first opposed pair of side walls; and
      (2) a second opposed pair of perforated side walls, said opposed pairs of walls forming an immersible portion and an external portion extending laterally from the immersible portion to support said supply structure and said storage structure;
   (d) filtration medium positioning guides locating said filtration medium over perforations of said perforated side walls;
   (e) a fluid conduit independent of ambient fluid within said aquarium for controlling fluid level in said immersible housing, said immersible housing and filtration medium being structured so that the aquarium medium will only flow between interior and exterior of the housing by passing through the filtration medium; and
   (f) means for advancing filtration medium between the supply and storage structures over said guides.

2. The filtration system of claim 1 wherein the filtration medium is positioned external to the housing adjacent the opposed perforated walls, and further external filter medium positioning structure is provided substantially along the outside of the immersed portion of said housing.

3. The filtration system of claim 1 wherein the filtration medium is positioned internal to the housing adjacent the opposed pair of perforated sides, and further filtration medium guide means are provided at the base of said filtration system, internally to said opposed perforated walls.

4. The filtration system of claim 1 wherein said storage structure includes continuous filtration medium take-up means.

5. The filtration system of claim 1 wherein pinch rollers are provided adjacent said storage structure and such rollers are provided with drive means to advance said medium.

6. The filtration system of claim 1 wherein said storage structure further includes a take-up reel and positioning means for said reel and filtration medium.

7. The filtration system of claim 6 wherein said reel is provided with drive means.

8. The filtration system of claim 1 wherein said supply and storage structures are combined to suspend the immersible housing on the edge of an aquarium.

9. The filtration system of claim 1 wherein guide means are provided for positioning expended filtration medium on said take-up means.

10. The filtration system of claim 1 further comprising a pair of driven rollers for continously drawing filtration medium from the supply structure through the filtration system to the storage structure.

* * * * *